A. R. MURRAY.
KEY SEATING ATTACHMENT.
APPLICATION FILED OCT. 6, 1906.
910,841.
Patented Jan. 26, 1909.
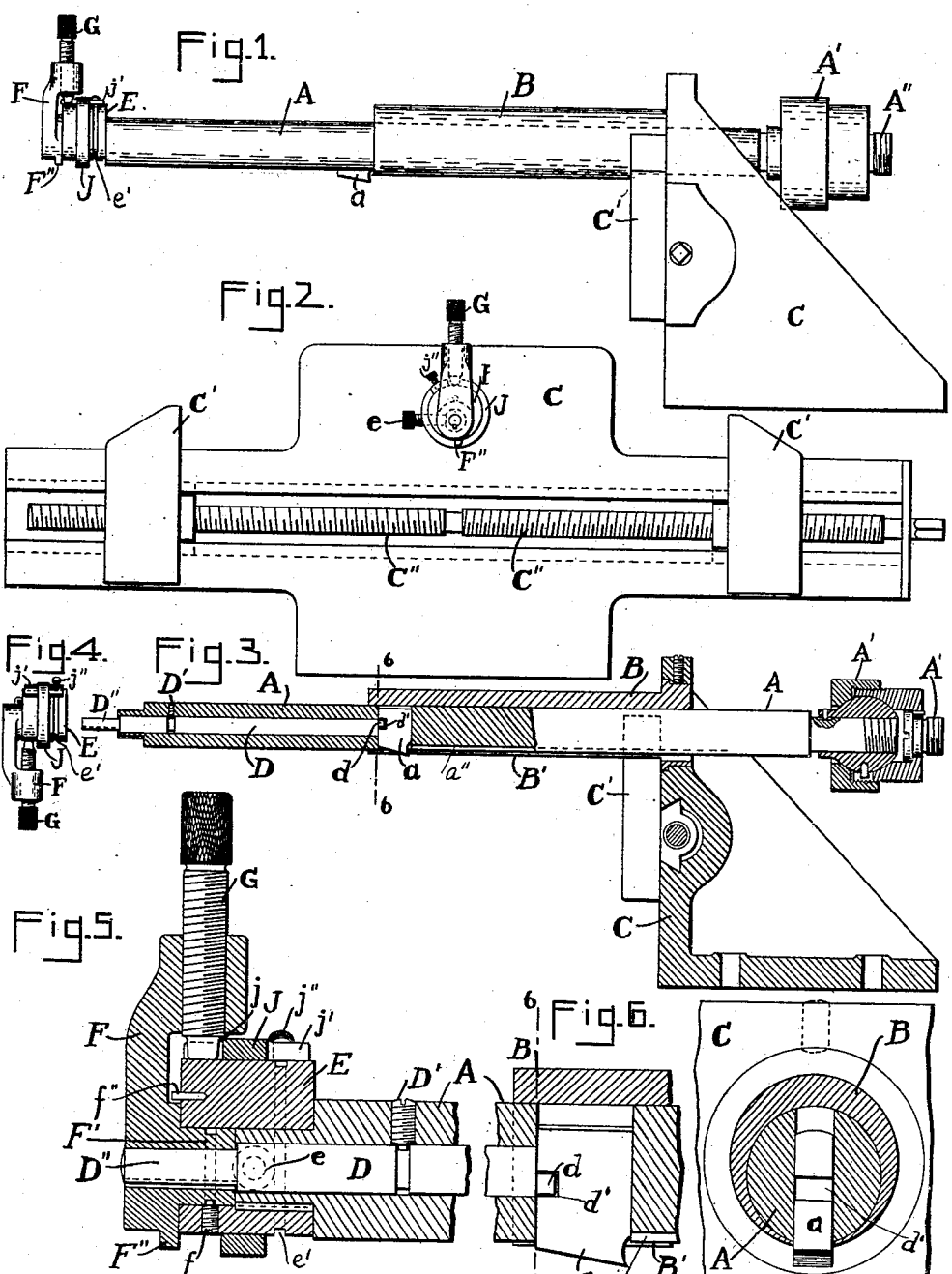

UNITED STATES PATENT OFFICE.

ARISTIDES REYNOLDS MURRAY, OF CINCINNATI, OHIO, ASSIGNOR TO THE CINCINNATI SHAPER COMPANY, OF CINCINNATI, OHIO, A CORPORATION OF OHIO.

KEY-SEATING ATTACHMENT.

No. 910,841.  Specification of Letters Patent.  Patented Jan. 26, 1909.

Application filed October 6, 1906. Serial No. 337,782.

*To all whom it may concern:*

Be it known that I, ARISTIDES REYNOLDS MURRAY, a citizen of the United States, and a resident of Cincinnati, in the county of Hamilton and State of Ohio, have invented a new and useful Improvement in Key-Seating Attachments for Shapers or Planers, of which the following is a full, clear, and exact description, reference being had to the accompanying drawings, which form a part of my specification.

My invention relates to a key-seating attachment or key-seating bar to be used with shaping machines, planers, or other reciprocating types of machines, and the object of the invention is to produce such a device of simple construction by means of which the depth of the key-seat may be definitely and accurately determined, and the cutter fed the desired amount at each stroke.

In the drawings:—Figure 1 is a side elevation of my improved key-seating attachment; Fig. 2 is a front elevation of the same; Fig. 3 is a longitudinal section through Fig. 1; Fig. 4 is a side elevation of the regulating device shown in its initial position; Fig. 5 is a section through the end of said regulating device on an enlarged scale; and Fig. 6 is a section through Fig. 3 on the line 6—6 thereof.

My improved key-seating attachment comprises a stationary bush upon which the work-piece is centered; a support for the bush provided with vise jaws to clamp the work-piece in place; a reciprocating bar working in the bush and carrying an adjustable tool which travels through a slot formed in the bush for the purpose; and a feeding mechanism by which the tool may be fed at each reciprocation, together with an adjustable stop which predetermines the limit of the feed of said tool. Thus the depth of cut of the tool at each stroke and the final depth of the key-seat is under the ready control of the operator.

A is the cutter-bar working within the bush B, which is secured in any convenient manner to an angle-plate C which supports the key-seating attachment and by means of which it is secured to the planer or shaper.

C', C', are vise-jaws which are dove-tailed into the front face of the angle-plate C, and which, by means of the reverse screws C'', C'', may be clamped upon the article in which the key-seat is to be made.

The bar A projects through the bush at the rear, and is there provided with a ball and socket coupling A', having a threaded end A'' to secure it to the reciprocating part of the shaper or planer.

$a$ represents the cutter which is located in a slot $a'$ in the cutter-bar A. The bush B is slotted on its under side as at B' to permit of the passage of the cutter, and the cutter-bar A is grooved beyond the cutter, as at $a''$ to give room for the chips.

The movement of the cutter is controlled by the following mechanism. The forward end of the cutter bar A is bored out to receive a rod D, having a pin $d$ located eccentrically in its end adjacent the cutter. The pin engages a horizontal groove $d'$ in the front face of the cutter. It is apparent that the rotation of this rod D will raise or lower the cutter. The rod D is held in place longitudinally by means of a screw D' passing through the cutter bar and engaging a circumferential groove in the rod D. The end of the cutter-bar A is turned down to receive an eccentric ring E which is keyed to said bar and is clamped in position by means of a thumb-screw $e$. The rod D projects beyond the cutter-bar, as at D'', and to this projection is keyed the feed lever F. The feed lever has a boss F' which fits within the end of the eccentric ring E, projecting beyond the limits of the bar A and a screw $f$ passing through the eccentric ring E into a circumferential groove on the boss F' retains the feed lever in place. An abutment F'' on the hub of the lever, and a pin $f''$ in the outer face of the eccentric ring E limits the movement of the lever to a swing of 180 degrees. G is a screw, threaded through the lever F, and engaging the face of the eccentric E. This screw serves as a handle for rotating the lever, and also as a gage for the feed of the cutter at each stroke of the bar. J is the depth gage, and comprises a ring bearing on the eccentric ring E, and having an abutment $j$ in the path of the end of the screw G, and an extension $j'$ through which passes a set-screw $j''$ engaging a groove $e'$ in the face of the eccentric E. It is apparent that by swinging the lever F the position of the cutter may be controlled, and that the screw G, in connection with the eccentric E, will determine the amount of the feed. At the same time, by manipulating the gage ring J, so as to limit the final movement of the lever F, and with it the limit of movement of the cutter a, the depth of the cut may be predetermined.

The operation of the device is as follows:— The thumb screw e is loosened, and the entire regulating device (see Figs. 3 and 4) is slipped off the end of the cutter-bar A. It is evident from the description of the connection of the several parts that this is possible, and that the whole combination will come off together. The work-piece is then slipped over the bar on the bush B, and is clamped in position by means of the jaws C'. The controlling device is then replaced and clamped by means of the thumb-screw e. The lever F is then shifted so as to be in the position indicated in Fig. 4. The gage ring J is turned so as to limit the final movement of the feed lever and with it that of the cutter a to the depth of the key-seat required; and the screw G is screwed down to bear on the shortest diameter of the eccentric E. The mechanism is now ready to be started. At each stroke, by turning the screw G, it may be brought to bear on a larger and larger diameter of the eccentric E, thus gradually lowering the cutter a, while at each back-stroke the operator may swing the lever F clock-wise to completely raise the cutter out of the key-seat. On the cutting stroke, after turning the screw so as to increase the depth of the cut, he swings the lever until the end of the screw is brought into contact with the circumferential face of the eccentric. This is continued until the end of the screw finally strikes the abutment j on the gage ring J, at which time the cut is finished and the key-seat is made of the required depth.

It is apparent that the bush B may be replaced by one of a different diameter to accommodate different work-pieces. It is also evident that a taper key-seat can be cut by making the axis of the bore of the bush at an angle to the axis of the outside of the bush.

Having thus described my invention, what I desire to claim as new, and cover by Letters Patent, is:—

1. A key-seating attachment for reciprocating machines comprising, a reciprocable bar, a slot in said bar, a tool located in said slot, a rotatable rod in said bar to raise or lower said tool, a lever keyed to the end of said rotatable rod, an eccentric keyed to said bar and a screw passing through said lever, and adapted to engage the surface of said eccentric.

2. A key-seating attachment for reciprocating machines comprising a reciprocable bar, a tool adjustably located in said bar, a rod to adjust said tool, a lever operating said rod, an eccentric keyed to said bar adjacent said lever, and a screw through said lever engaging said eccentric.

3. A key-seating attachment for reciprocating machines comprising, a reciprocable bar, a tool adjustably located in said bar, a rod to adjust said tool, a lever operating said rod, an eccentric keyed to said bar adjacent said lever, a screw through said lever engaging said eccentric, and an adjustable ring to limit the final movement of said lever.

4. A key-seating attachment for reciprocating machines, comprising a reciprocable bar, a slot in said bar, a tool located in said slot, said tool having a transverse groove in its front face, a rotatable rod in said bar provided with a projecting pin at one end eccentric of its axis, said pin engaging said groove, a lever to rotate said rod, and adjusting mechanism intermediate said lever and said bar to limit the throw of said lever.

5. A key-seating attachment for reciprocating machines, comprising a reciprocable bar, a slot in said bar, a tool located in said slot, said tool having a transverse groove in its front face, a rotatable rod in said bar provided with a projecting pin at one end eccentric of its axis, said pin engaging said groove, a lever to rotate said rod, an adjusting screw carried by said lever, and means coöperating with said screw to determine the throw of said lever.

6. A key-seating attachment for reciprocating machines, comprising a reciprocable bar, a slot in said bar, a tool located in said slot, said tool having a transverse groove in its front face, a rotatable rod in said bar having a pin at its end, eccentric of its axis, engaging said groove, a lever keyed to the other end of said rod, an eccentric keyed to said bar adjacent said lever, and a screw carried by said lever engaging said eccentric.

7. A key-seating attachment for reciprocating machines, comprising a reciprocable bar, a slot in said bar, a tool located in said slot, said tool having a transverse groove in its front face, a rotatable rod in said bar provided with a projecting pin at one end eccentric of its axis, said pin engaging said groove, and adjusting means to determine the angle through which said rod may be turned at each reciprocation of said bar.

ARISTIDES REYNOLDS MURRAY.

Witnesses:
CLARENCE E. MEHLHOPE,
JOS. LEW KUHL.